Patented July 10, 1923.

1,461,675

UNITED STATES PATENT OFFICE.

WILLIAM BEACH PRATT, OF WELLESLEY, MASSACHUSETTS, ASSIGNOR TO E. H. CLAPP RUBBER COMPANY, OF BOSTON, MASSACHUSETTS, A CORPORATION OF MASSACHUSETTS.

RECLAIMING VULCANIZED RUBBER.

No Drawing. Application filed May 25, 1918, Serial No. 236,464. Renewed December 6, 1922.

*To all whom it may concern:*

Be it known that I, WILLIAM BEACH PRATT, a citizen of the United States, residing at Wellesley, in the county of Norfolk and State of Massachusetts, have invented new and useful Improvements in Reclaiming Vulcanized Rubber, of which the following is a specification.

This invention relates to the reclamation of vulcanized rubber for reuse in the arts, and has for its object so to treat the rubber that the end product will have a greater tensile strength and a better stretch and set than have heretofore been secured with reclaimed rubber of a similar grade when subjected to the usual or commercial processes.

The novel step, which characterizes the present invention, is that of softening the vulcanized rubber by means of a vulcanized-rubber solvent.

The vulcanized rubber,—discarded tires, etc.,—may be "cracked" and comminuted by the usual machinery, clarified or freed from fiber by the ordinary acid or alkaline treatment, washed and freed from metallic and other foreign bodies as ordinarily, and then dried and ground.

In accordance with the present invention, the product thus produced is placed in an ordinary mixing apparatus together with the required amount of the solvent—say 2%–10% by weight—and the mass is stirred or agitated until the solvent thoroughly permeates the mass. The mass is then placed in a closed gun or digester, and with the injection of steam is digested at an elevated temperature, e. g., 150°–250° C., and at a corresponding pressure for a sufficient time until the softening action is completed. The time required will vary, of course, but will ordinarily be from 6 to 20 hours, or until the solvent has thoroughly permeated the vulcanized rubber.

The remaining operations need not differ from those generally followed. That is, the mass may be cooled, dried and strained, run through refining rolls and sheeted.

To produce a suitable volatile solvent for use in digesting the vulcanized rubber in accordance with my process, one may proceed as follows: Commercial oil or spirits of turpentine (or any other suitable terpene-containing substance) is digested with say (2% to 10% by weight) commercial hydrated crystalline oxalic acid, at atmospheric pressure or above, at a temperature of not less than 140°–160° C., for about an hour, more or less, depending upon the speed at which the temperature is raised. The mass is cooled until the acid crystallizes and separates out, whereupon the acid is removed, and the remaining product is preferably washed effectively to remove all acid therefrom. This product now consists of a mixture of light and heavy oils, and may be introduced into the mixer, previously described for incorporation with the comminuted scrap vulcanized rubber. If desired, however, the lighter oils may be first distilled off to leave as a residuum only those heavy oils which boil at 202° C. and above. These heavy oils are volatile and are especially efficient for use with vulcanized rubber, both hard and soft. For thinning or diluting the heavy oils, one may use those distillates resulting from the fractional distillation of the said product, which boil at 174°–178° C.

Of course, instead of first mixing the solvent and the comminuted scrap rubber in a separate mixer before placing the mass in a digester, they may be under certain conditions placed initially in the digester and stirred or agitated while the mass is being digested.

What I claim is:—

1. In reclaiming vulcanized rubber, digesting such rubber at an elevated temperature with a neutral compound (derived by treating oil or spirits of turpentine substance with oxalic acid), until the mass has reached the desired degree of tackiness and cohesion.

2. In reclaiming vulcanized rubber, digesting such rubber at a high pressure at an elevated temperature with a neutral compound obtained by digesting a suitable oil or spirits of turpentine with oxalic acid at an elevated temperature.

3. In reclaiming vulcanized rubber, digesting such rubber at an elevated temperature with approximately 2% to 10% of a volatile solvent obtained by digesting oil of turpentine with oxalic acid at an elevated temperature and removing the acid.

In testimony whereof I have affixed my signature.

WILLIAM BEACH PRATT.